Feb. 23, 1965    G. J. FREY ETAL    3,170,369
SLIDE PROJECTOR

Filed July 18, 1962    2 Sheets-Sheet 1

GERALD J. FREY
CLINTON W. HOUGH
INVENTORS

BY

AGENT

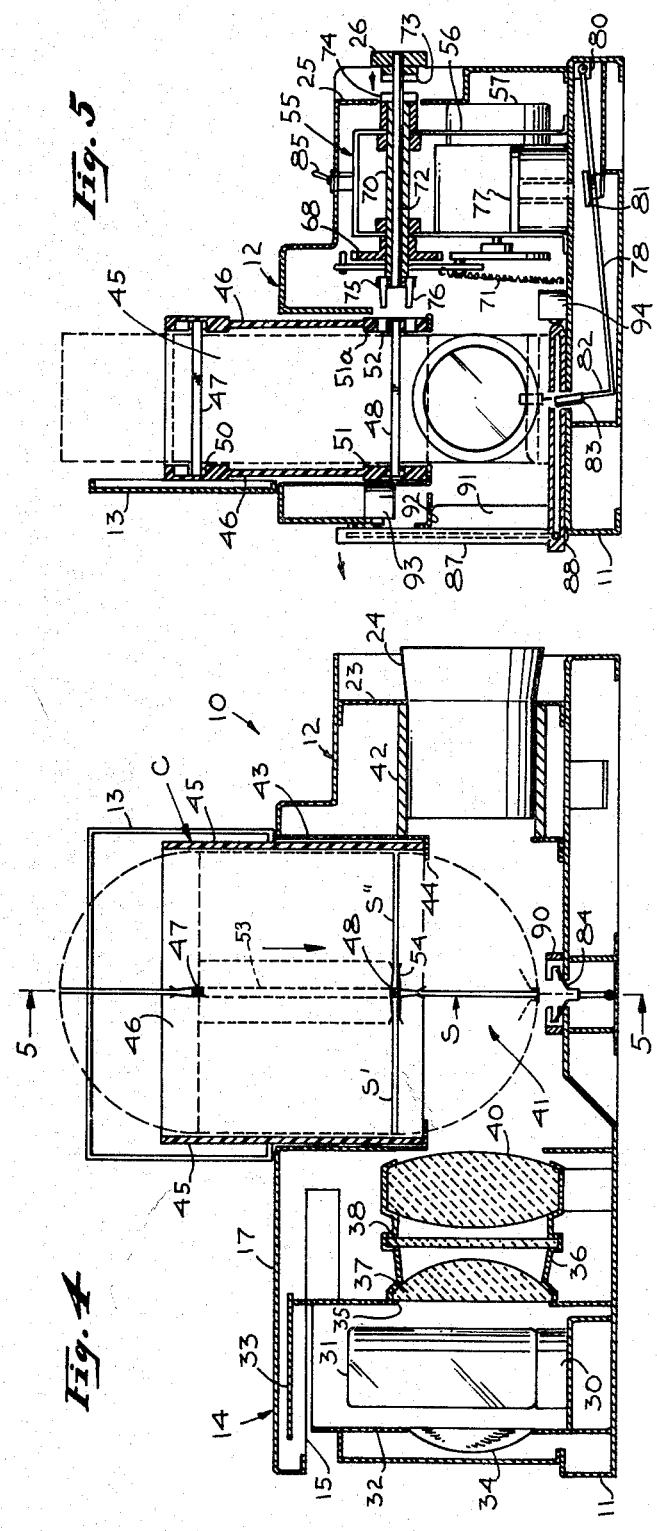

United States Patent Office 3,170,369
Patented Feb. 23, 1965

3,170,369
SLIDE PROJECTOR
Gerald J. Frey, 1834 Devon Road, and Clinton W. Hough, 600 Chatham Place, both of Pasadena, Calif.
Filed July 18, 1962, Ser. No. 211,950
5 Claims. (Cl. 88—28)

The present invention relates generally to slide projectors and relates more particularly to slide projectors for use with film transparencies which may be carried by and stored in suitable cartridges or housed individually, as desired.

The prior art is replete with a multitude of structures and apparatus that are used for receiving and projecting images carried by film transparencies onto a projection screen. Such devices commonly employ suitable optical systems and illuminating structures, such as bulbs, together with means for supporting and retaining an image bearing transparency. In general, the most prevalent types of film transparencies are those commonly referred to as 35 mm. slides which are carried by a supporting frame of compressed paper, cardboard, metal, or the like. It has also been common practice to employ various types of cartridges in the form of drawer-like structures having grooved side portions for receiving slides. In projectors incorporating automatic operating apparatus to permit automatic sequential insertion and withdrawal of slides from a projector, these prior cartridges are attached to the projector in a manner whereby the apparatus will serve to remove individual slides from the cartridge for projection and thereafter replace the slide in the cartridge. The usual prior art cartridges retained twenty-five to fifty such slides and groups of cartridges are commonly stored in boxes or the like. Accordingly, considerable space has been required to provide storage for the usual several hundred slides in individual libraries.

While the discussed prior art automatically operable slide projectors and changers have been known heretofore, these prior structures have been extremely complex, difficult to maintain and service, expensive to repair and, of course, the complex structures dictate relatively high initial price. Further, problems are presented in prior art structures relative to the maintenance of proper focus as between sequentially displayed slides, inasmuch as most 35 mm. transparencies are supported at only their periphery by a relatively flexible mount and some projection systems permit sufficient heat application to the slide as to cause buckling or bending and accordingly loss of critical focus. In such instances constant manual refocusing is necessary, thus reducing the quality of the projected image and any program continuity for any one group of slides.

It is, therefore, one important object of the present invention to provide a slide projector having novel features enabling use of plurality of cartridge supported slides.

A further important object of the invention is to provide a slide projector including automatic apparatus for sequentially displaying a plurality of cartridge-carried slides.

Still another object of the invention is to provide a slide projector including automatic means for positioning an image bearing transparency in an optical system for projection, means being provided to maintain critical position of the slide and focus thereof on a screen.

A further object of the invention is to provide a slide projector including means whereby an established sequence of slides may be displayed in a particular order or in a reverse order at any desired rate and either fully automatically or manually.

Still another important object of the invention is to provide a slide projector having an automatic projection sequencing mechanism in combination with a cartridge arrangement for supporting a plurality of slides and wherein means are provided for rapidly, easily and accurately changing and/or disposing a cartridge of slides in the projection apparatus.

In accordance with the invention, the recited objects are accomplished by means of a slide projector including a projection and optical system and a slide gate arrangement for disposing and operable in conjunction with an endless belt type of cartridge for supporting plurality of slides. Means are provided for individually disposing a single slide from the endless belt cartridge and in the projection gate in a manner to maintain critical position and associated focus relative to the slide and an image carried thereby. Means are also provided for mechanically connecting a driving mechanism with the cartridge and the endless belt supporting a plurality of slides with a driving apparatus that is intermittently operable to provide for movement of different slides to the projection gate and a suitable dwell time therein. Means are also provided for by-passing the automatic control mechanism and permitting use of the present slide projector in conjunction with individually inserted slides rather than those carried by a cartridge arrangement.

It is to be understood that other and further important objects of the invention will become apparent from disclosures in the following detailed specification, appended claims and accompanying drawings, wherein:

FIG. 4 is a longitudinal section view taken substantially as indicated by line 4—4, FIG. 2, and illustrating a type of multiple slide endless belt cartridge arrangement and an optical system as employed in the present slide projector;

FIG. 5 is a transverse sectional view through the slide projector cartridge and drive mechanism as taken, substantially as indicated by line 5—5, FIG. 4; and FIG. 6 is a schematic wiring diagram of the present slide projector.

Figure 1:
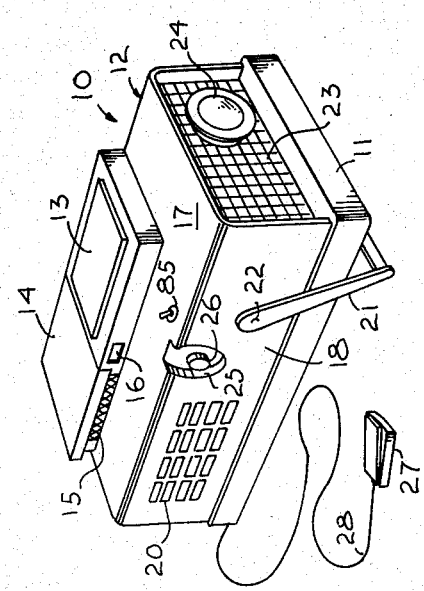
FIGURE 1 is a perspective view of the present slide projector.

With reference to the drawing, and with reference primarily to FIG. 1, the slide projector of the present invention is shown as indicated generally at 10. The projector includes a generally rectangular structure 11 on which is supported a housing indicated generally at 12 and carrying an access door 13 to permit insertion of a cartridge. The housing 12 is further provided with a turret portion 14 having a heat exhaust port 15 and carrying suitable film viewing window 16, through which photographic slides may be viewed prior to insertion into the projector and projection thereof. The housing 12 has an upper wall 17 and side walls 18, the side walls 18 being provided with suitable louvers 20 therein to permit influx of air for cooling of the projection system of the projector. The side walls 18 of the housing 12 also serve pivotally to support an adjustable stand 21 that is connected as at 22 to the side walls 18 of the housing. The projector still further includes a decorative front wall 23 through which a projection lens 24 extends. As shown in FIG. 1, one of the side walls 18 may be recessed as at 25 for reception of a knob 26 which may serve to control manual movement of the slides within a cartridge as will be described in detail hereinafter. Also, a suitable remote control indicated generally at 27 may be connected to the slide projector as by a cable 28.

Figure 2:
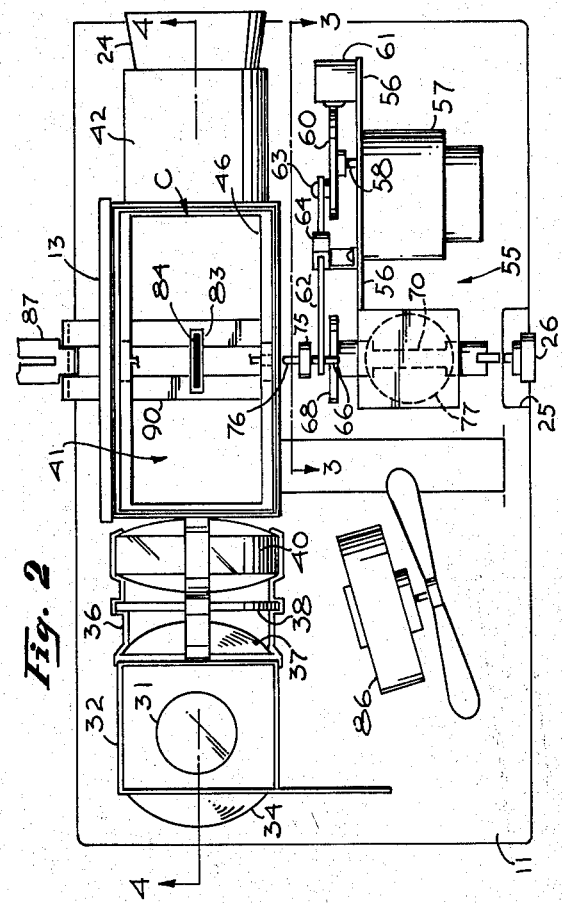
FIG. 2 is a top elevation view of the slide projector with the outer case removed and illustrating an arrangement of components therein.

With reference primarily to FIGS. 2 and 4, it may be seen that the projection and optical system of the present projector includes a socket 30 carried by the base 11 and which serves to support a projection bulb 31. The bulb is carried in a chimney housing 32, the upper portion of which is provided with light baffles 33 and which communicate with the port 15 to permit egress of air over and from the projection bulb 31. The housing 32 serves to support a reflector 34 and has an opening 35 to which a barrel 36 of an optical system support arrangement is attached. A suitable optical system for use with the present apparatus is supported by the barrel 36 and includes a condensing lens 37, a planar sheet of transparent heat absorbing material 38 and a collimating lens 40. The collimating lens 40 is spaced a substantial distance from the projection lens 24 with the area there between being defined generally as a projection gate and indicated generally at 41. As shown in FIG. 2, the projection lens 24 is axially moveable carried by a cylindrical housing 42 that is connected to the base 11 and front wall 23 to permit axial movement of the projection lens 24 for initial focusing purposes. Thus, a slide indicated generally at S and disposed in the projection gate will be illuminated and projected from the lens 24 onto any suitable screen.

As shown again in FIGS. 2, 4 and 5, a suitable rectangular frame 43 is carried by the housing 12 and extends into the projector in an area beneath the access door 13. The frame 43 includes lips 44 at the lower end thereof which serve to engage the lower end of a generally rectilinear cartridge indicated generally at C. The cartridge C is generally rectangular in cross-section including end walls 45 and side walls 46 which may be made from any suitable material, such as a plastic, for example. The walls 45 and 46 thereby define a rectangular tubular structure that is adapted for reception for the frame 43. The walls 46 serve rotatably to support a pair of shafts 47 and 48 that are generally rectangular in cross-section and which are carried by enlarged journal members 50 and 51, respectively, that are rotatably carried by the walls 46. One of the journal members 51a, is provided with a plurality of openings 52 spaced radially from and generally parallel to the shaft 48 for a purpose to be hereinafter more fully described.

The shafts 47 and 48 serve to support an endless belt 53 which may either carry a plurality of slide supporting members 54 as by attachment thereof to the belt by suitable adhesive, or the like, or may be a long endless belt such as that disclosed in Patent Number 2,521,348, issued September 5, 1950, to Verne L. Davis. The particular type of belt is a matter of choice and forms no particular part of the present invention. In belts of this type, the slide supporting clips 54 are disposed in side by side relationship and have generally planar lower surfaces which engage the flats of the shafts 47 and 48, the construction being such as to dispose the plurality of slides carried by the clips of the belt in the positions illustrated in FIG. 4, and wherein a single slide S is disposed in the projection gate 41 and adjacent slides S' and S'' are maintained in a generally horizontal and coextensive manner out of the projection gate, as shown. It may thus be seen that a cartridge of this type serves to support a large number of individual slides which will occupy a space equal to approximately one-third that occupied by slides in the heretofore known groove type cartridges employed with prior automatic slide projectors. It may also be seen that the cartridge C may be easily and simply inserted in and removed from the projector as desired merely upon insertion in or removal from the frame 43, lips 44 serving to limit downward movement of the cartridge C.

Figure 3:
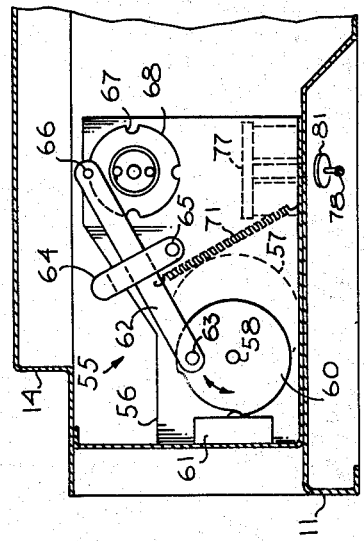
FIG. 3 is a fragmentary sectional view showing a portion of the automatic drive mechanism for a cartridge of slides and taken substantially as indicated by line 3—3, FIG. 2.

Further, in accordance with the present invention, the driving mechanism for the belt 53 for cartridge C is indicated generally at 55 and illustrated primarily in FIGS. 2, 3 and 5. The driving mechanism is supported within the housing 12 and carried by a suitable frame structure 56 that is connected to the base 11. The automatic changing and driving mechanism includes a motor 57 having an output shaft 58 which carries a cam 60. The cam 60 is positioned for cooperation with a normally opened switch 61 and further, pivotally carrying arm 62 as at 63. The arm 62 extends through a bifurcated guide 64 that is pivotally supported as at 65 to the frame structure 56. An end of the arm 62, remote from the shaft 63, takes a pin 66 that is adapted for consecutive engagement with a plurality of notches 67 in a driving wheel 68. The driving wheel 68 is carried by a tubular shaft 70 that is journaled in the frame support 56, the construction being such that upon each revolution of the cam 60, the pin 66 will engage one of the slots 67 to move the wheel 68 through an angle of approximately 90° in either direction, depending upon the direction of rotation of cam 60. It may be seen that the arm 62 is urged into engagement with guide 64 by means of a tension spring 71 connected to the arm and to the base 11 and that the pin 66 is out of engagement with wheel 68 except during the time the wheel 68 is rotated through the 90° angle. The tubular shaft 70 serves to support a shaft 72 that is axially slideable therein. One end of the shaft 72 protrudes from the housing 12 through the recesses 25 and carries the knob 26, previously described. The knob 26 is provided with a notched clutch element 73 as adapted to mate with clutch element 74 carried by the tubular shaft 70, mating of the clutch elements being accomplished by the axial movement of the shaft 72. The other end of the shaft 72 carries a driving element 75 having pins 76 that are adapted to enter a pair of the openings 52 in the journal 51a carried by the shaft 48, thus providing a driving connection between wheel 68 and the belt 53 of the cartridge C. In this connection, it may also be seen that the belt 53 may be moved manually upon rotation of the knob 26 when the pin 66 is out of engagement with any one of the notches 67 carried by the wheel 68. The construction of the driving mechanism is thus such that upon each rotation of the cam 60 a slide S is disposed in the projection gate 41 and permitted to remain in the gate for a finite period of time. Additionally, as will be hereinafter more fully described, the cam 60 serves to operate the switch 61 which controls operation of the projection bulb 31, the bulb 31 being turned on while a slide S is in the projection gate and turned off during the period when one slide is moving out of and another slide is moving into the projection gate.

As shown in FIGS. 3, 4 and 5, an electromagnet 77 is carried by the base 11 and positioned within the frame structure 56. An arm 78 is pivoted as in 80 within confines of the base 11 and serves to carry a permeable element 81 that is positioned for cooperation with a core of the electromagnet 77. The end of the arm 78 remote from the pivot 80 is angularly disposed as at 82 and extends through a slot 83 in the base 11. The end of the arm portion 82 serves to support a bifurcated slide alignment member 84, the construction being such that upon energization of the electromagnet 77 the arm 78 will be moved in a direction to elevate the arm portion 82 and member 84 whereby to engage a lower edge of the slide S disposed in the projection gate 41 and retain the slide in a finite location. The electromagnet 77 is operable simultaneously with energization of the bulb 31, and the member 84 moves gravitationally out of engagement with the slide S during the period when one slide is being removed from and another being disposed in the projection gate 41. As will be hereinafter more fully described a suitable switch 85 carried by the housing 12 serves to permit removal of the electromagnet 77 from the system when desired.

To provide for cooling of the projection system a suitable motor driven fan 86 is mounted on the base 11 and positioned to direct a flow of cooling air from the louvers 20 over the projection bulb 31 and outwardly from the housing at the port 15. Additionally, suitable low wattage bulbs are installed behind the windows 16 located on each side of the turret 14 to permit viewing of individual slides as desired.

In order that the present projector may be used to display individual slides, an individual slide carrier 87 is pivotally connected by means of pins 88 to one end of a slotted slide 90 carried by the base 11. The slide carrier 87 is provided with slide receiving guides 91 which extend into a suitable slot 92 in one of the side walls 18 of the housing 12. An end of the carrier 87 remote from the pivot 88 is secured in a stored position whereby to engage an operating member of a switch 93 to maintain the switch 93 in a closed position. When the carrier 87 is moved to a horizontal position a slide may be inserted therein and moved manually through the projection gate 41, the pins 88 of the carrier moving in the guide 90 and when in position an inner end of the carrier 87 serves to engage a switch 94 which is arranged and parallel with the cam operated switch 61 to energize the bulb 31 which will be more fully understood with reference to the wiring diagram of FIG. 6. During such operation, the switch 85 controlling operation of the electromagnet 77 is opened although no damage to the mechanism will result in the event the switch 85 is inadvertently left closed inasmuch as the operating mechanism for the slide alignment mechanism comprises a mechanical link.

With reference to the wiring diagram of FIG. 6, it is to be noted that an A.C. connection is made at the terminals 95 and the bulbs 96 positioned behind each of the windows 16 together with the fan motor 86 and energized. With the switch 85 closed, and the switch 93 in a closed position, each rotation of the cam 60 will close the switch 61 whereby to energize the projection bulb 31 and the electromagnet 77. Additionally, the remote control 27 includes a reversing switch 97 which controls operation of the motor 57 in a forward or reverse direction. A suitable capacitor 98 and resistor 100 combination are connected in series across the windings of the motor 57 to prevent arcing of the contacts of the switch 97. A suitable switch 101 may be placed in one of the leads extending to the motor control circuit and may be operable in conjunction with the switch 85, as desired, to de-energize the motor when the projector is used for manual projection of individual slides.

It may thus be seen that the slide projector of the present invention serves to enable accomplishment of the objects set forth hereinbefore and provides for automatic or manual projection of slides from a cartridge in manner that is simple and reliable, the reliability being enhanced by the simplicity of the structures. Additionally, it is noted that insertion and removal of the cartridge may be easily accomplished, thus adding to a user's pleasures in connection with the slide projector by reducing time required for cartridge changing in a program of selected slides. Additionally, rapid editing of selected slides may be accomplished by manual rotation of the knob 26, or individual slides may be viewed through use of the manually operated slide holder 87.

Having thus described the invention and the present embodiment, it is desired to emphasis the fact that many modifications may be resorted to in a manner limited only by a just interpretation of the following claims.

We claim:

1. In a projector for use with bound image bearing transparency slides, the combination of:
    a housing including a base portion, supporting structure and outer cover;
    an optical system disposed in said housing and having a space between elements thereof to define a projection gate;
    an illuminating system disposed in said housing and positioned for cooperation with said optical system;
    a generally rectangular cartridge removably positioned in said housing and extending partially therefrom, said cartridge including a pair of spaced shafts;
    an endless belt positioned about said spaced shafts, said belt having a plurality of adjacently disposed clips for individually supporting and retaining individual slides, a plane extending through axes of said shafts being in alignment with said projection gate;
    a driving mechanism carried by said base and removably operatively coupled to at least one of said shafts to impart angular movement thereto sufficient sequentially to dispose each of said slides individually in said projection gate;
    means forming a portion of said coupling of said driving mechanism for permitting each of said slides to remain in said projection gate for a finite predetermined period of time;
    means engageable with each slide in said projection gate for aligning said slide therein; and
    circuit means for energizing said illuminating system and said slide aligning means only when a slide is positioned within said projection gate.

2. A projector according to claim 1 wherein said driving means selectively engages one of said shafts positioned closest to said projection gate, said one of said shafts being generally square in cross-section and said clips on said belt engaging flats of said one of said shafts whereby to dispose a single slide in said projection gate.

3. A projector according to claim 1 wherein said slide aligning means includes an electromagnet carried by said base and an armature having one end pivotally carried by said base and another end having a bifurcated terminal portion disposed adjacent said projection gate and movable upon energization of said electromagnet into engagement with an edge of a slide remote from the supporting clip thereof.

4. A projector according to claim 1 wherein said circuit means includes switch means and said driving mechanism includes a continuously rotating cam engageable with said switch means, angular velocity and contour of said cam serving to predetermine said finite period said slide remains in said projection gate.

5. A projector according to claim 4 wherein said circuit means further includes means for interrupting and reversing a direction of rotation of said driving mechanism to permit a sequence of slides to be displayed in a reverse order thereof.

References Cited in the file of this patent

UNITED STATES PATENTS

| | | |
|---|---|---|
| 1,352,471 | Patterson | Sept. 14, 1920 |
| 1,411,759 | Taussig | Apr. 4, 1922 |
| 2,194,240 | Worth | Mar. 19, 1940 |
| 2,336,978 | Bodde | Dec. 14, 1943 |
| 2,521,348 | Davis | Sept. 5, 1950 |